US008519886B2

(12) United States Patent
Ainsworth et al.

(10) Patent No.: US 8,519,886 B2
(45) Date of Patent: Aug. 27, 2013

(54) SYSTEM AND METHOD FOR USING GPS INTERFEROMETRY TO DETERMINE ATMOSPHERIC CONDITIONS

(75) Inventors: Thomas L Ainsworth, Burke, VA (US); Gerald Nedoluha, Bowie, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/955,522

(22) Filed: Dec. 13, 2007

(65) Prior Publication Data

US 2009/0153396 A1   Jun. 18, 2009

(51) Int. Cl.
*G01S 19/14* (2010.01)
*G01S 19/53* (2010.01)

(52) U.S. Cl.
USPC ................... 342/357.52; 342/357.36

(58) Field of Classification Search
USPC .............. 342/357.06, 357.36, 357.22, 357.52
See application file for complete search history.

(56) References Cited

U.S. PATENT DOCUMENTS

| 4,894,662 A | 1/1990 | Counselman |
| 5,548,293 A * | 8/1996 | Cohen ....................... 342/357.38 |
| 5,570,097 A | 10/1996 | Aguado |
| 6,304,760 B1 | 10/2001 | Thomson et al. |
| 6,853,331 B1 * | 2/2005 | Belen'kii et al. ............. 342/159 |
| 6,944,540 B2 | 9/2005 | King et al. |
| 7,046,934 B2 * | 5/2006 | Badesha et al. ............... 398/121 |
| 7,353,690 B2 * | 4/2008 | Solheim et al. ............. 73/29.01 |
| 7,358,893 B2 * | 4/2008 | O'Brien ................... 342/357.36 |
| 2007/0276598 A1 * | 11/2007 | Tillotson ....................... 701/213 |
| 2008/0117106 A1 * | 5/2008 | Sarno et al. .................. 342/444 |

FOREIGN PATENT DOCUMENTS

WO    WO00/22452    4/2000

OTHER PUBLICATIONS

"Flight Tests of Attitude Determination Using GPS Compared Against an Inertial Navigation Unit" Cohen, Clark E. et al. Presented at the ION National Technical Meeting, San Francisco, CA, Jan. 20-22, 1993.*

D.L. Clausing, "The Aviator's Guide to Navigation", McGraw Hill, fourth edition, 2006, pp. 188-189.

* cited by examiner

*Primary Examiner* — Cassie Galt
(74) *Attorney, Agent, or Firm* — Sally A. Ferrett; Amy L. Ressing (57) ABSTRACT

A method and system for determining a bending angle and/or the presence of atmospheric ducting. An array of antennas is used in order to form an interferometer. The interferometer receives signals from GPS satellites and uses the index of infraction in order to determine a bending angle of the GPS signals and/or the presence of atmospheric ducting.

10 Claims, 8 Drawing Sheets

SYSTEM AND METHOD FOR USING GPS INTERFEROMETRY TO DETERMINE ATMOSPHERIC CONDITIONS

BACKGROUND OF THE INVENTION

1. Field of the Invention

The present invention is related to the field of atmospheric studies. In particular, the invention is related to use of the GPS constellation to determine atmospheric conditions.

2. Description of the Related Technology

GPS receiver arrays have previously been employed for mapping tropospheric water vapor and the total electron content (TEC) of the ionosphere. The receiver arrays track all GPS satellites above a low-elevation threshold, typically ~10° above the horizon. Originally, only maps of the total column water vapor, or TEC, were obtained from relatively sparse arrays. Dense GPS arrays permit tomographic mapping of water vapor content in the troposphere. Tropospheric water vapor tomography exploits the time delays of the GPS signals between all satellite-receiver pairs. The delays are measured and preprocessed to remove the systemic errors from both the satellite and the receivers. Inverting the preprocessed data set produces a map of tropospheric water vapor.

Typically, GPS arrays cover from $10^2$-$10^5$ km$^2$ and employ 15-70 individual receivers. Accurate atmospheric measurements require precise GPS orbits, and these are typically available within 1-3 weeks of data collection. Smaller arrays can be sensitive to the low-elevation cut-off. In all cases, GPS arrays are benchmarked at known, fixed locations.

While long-baseline GPS arrays have been developed to make atmospheric measurements, short-baseline GPS arrays have been developed for attitude (roll, pitch and yaw) determination of surface vehicles, aircraft and Low Earth Orbit (LEO) satellites. Short-baseline arrays typically consist of 2-4 receivers with baselines between antennas of 0.1-10.0 m. The short-baseline arrays are designed for dynamic position and attitude determination. Hence the absolute array location follows from standard GPS algorithms with the inherent GPS user equivalent range errors, $1\sigma$~1-2 m. User equivalent range errors can arise from uncertainties in the GPS satellite clock and satellite ephemeris, and, at low-elevation angles, unknown tropospheric water vapor content.

Attitude derives from precise relative locations of the array antennas with respect to a reference antenna. Determining relative positions of the array antennas to an accuracy of ~0.2 mm is achieved by tracking the phase of the L1 GPS carrier frequency (f=1575.42 MHz or $\lambda \approx 19$ cm) that is employed by commercially available GPS receivers. For small arrays, the atmospheric propagation delays are the same for all receivers. Therefore, for interferometric measurements, the troposphere, ionosphere and systematic satellite induced range errors cancel. While the absolute distance between satellite i and receiver j, $\phi_j^i$, is not precisely determined, the difference, $\phi_j^i - \phi_k^i$, between the satellite i and the two receivers j and k is known to a fraction of a wavelength. For small baselines the GPS antennas all employ the same receiver clock, therefore, receiver clock errors are insignificant. For a 1 meter interferometric baseline the relative positional accuracy of 0.2 mm translates into an angular accuracy of 0.01°. The angular accuracy is baseline dependent, thus doubling the interferometric baseline doubles the angular resolution.

Relevant ship-borne atmospheric measurements typically consist of "daily" radiosondes. These instrumented balloons provide accurate temperature, pressure and water vapor measurements along their trajectory. However, they present an uncontrolled flight path and an airborne hazard for aircraft in the vicinity. Additionally, diurnal variations, which are known to be large, are completely missed by infrequent radiosonde launches. Therefore, at present, there is no reliable method to assess local atmospheric refraction in a timely manner.

Surface-level atmospheric ducting represents a significant challenge to detection of airborne targets. However, current methods of detecting atmospheric ducting are impractical and/or inaccurate. It is therefore desirable to provide a new technique and system to assess the presence of atmospheric ducting.

SUMMARY OF THE INVENTION

An object of certain embodiments of the present invention is a system for determining the presence of atmospheric ducting.

Another object of certain embodiments of the present invention is a method for determining the presence of atmospheric ducting.

Yet another object of certain embodiments of the present invention is a method of using GPS signals to determine the difference between the apparent and true positions of GPS satellites.

Still yet another object of certain embodiments of the present invention is a method for determining the bending angle caused by atmospheric conditions.

One aspect of the present invention can be a system for determining the presence of atmospheric ducting comprising: a first antenna for receiving GPS signals; a second antenna positioned above the first antenna, wherein the second antenna receives GPS signals; a receiver operably connected to the first and second antennae; and a GPS satellite for transmitting GPS signals.

Another aspect of the present invention can be a method for determining a bending angle comprising the steps of: providing an interferometer and a receiver; receiving a first GPS signal from a first GPS satellite; determining an apparent position of the first GPS satellite from the first GPS signal; determining a true position of the first GPS satellite from the first GPS signal; and determining the bending angle by calculating the difference between the apparent position and the true position of the first GPS satellite.

Yet another aspect of the invention can be a method for determining the presence of atmospheric ducting comprising the steps of: providing an interferometer and a receiver, wherein the step of providing the interferometer comprises the steps of positioning a first antenna and positioning a second antenna above the first antenna, wherein the distance between the first antenna and the second antenna is determined by receiving a first signal from a first GPS satellite, wherein the first GPS satellite is located at an apparent position greater than 15° above the horizon; receiving a second GPS signal from a second GPS satellite; determining an apparent position of the second GPS satellite from the second GPS signal; determining a true position of the second GPS satellite from the second GPS signal; determining a bending angle by calculating the difference between the apparent position and the true position of the second GPS satellite, and determining the presence of atmospheric ducting using the bending angle.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

This present invention employs a system that in one embodiment includes two antennae and a GPS receiver. The two antennae are used interferometrically to measure the apparent position of GPS satellites. Differences between the apparent positions and the known, or true, positions for each GPS satellite provide information regarding the atmospheric index of refraction along the path from the satellite to the receiver. A rapid decrease in the index of refraction with a decrease in altitude generates optical and radar ducts.

Generally GPS navigation systems employ only those satellites positioned at greater than 10° above the local horizon. Timing signals from GPS satellites at lower elevation angles are delayed by variable atmospheric conditions, e.g. water vapor. Those delays can generate large positional errors. For atmospheric observations these positional errors can be useful. A comparison of the observed elevation angle to the known satellite position can be used to determine the atmospheric bending of the path of the GPS signals. Therefore, tracking GPS satellites as they rise and set permits a coarse retrieval of the atmospheric index of refraction. Large bending angles are observed in ducting or near ducting atmospheric conditions. When the GPS antennae and receivers are positioned to geometrically match ship-borne radar and optical sensors, then they will measure the effects of atmospheric ducting when it is most useful, e.g. for target detection in military vessels.

To date, short baseline interferometric GPS techniques have only been applied to vehicle, aircraft, and satellite attitude determination. The present invention uses a short baseline interferometer to measure the apparent elevation of GPS satellites from a moving ship, or other "water capable vessel", which is defined herein as a vessel capable of moving and operating at sea or in other bodies of water, such as ship, boat, submarine, etc., however land-borne applications are not precluded. Thus, in one embodiment, the first antenna, the second antenna and the receiver are all located on land. Comparing the apparent elevation angle to a known orbit location of the satellite permits a determination of the total bending angle of the GPS transmission through the atmosphere. Absolute path length delays, precise absolute positioning and precise ephemeris information are not required in order to determine the total bending angle and hence to also determine the presence or absence of a ducting, or near ducting, atmosphere.

Figure 1:
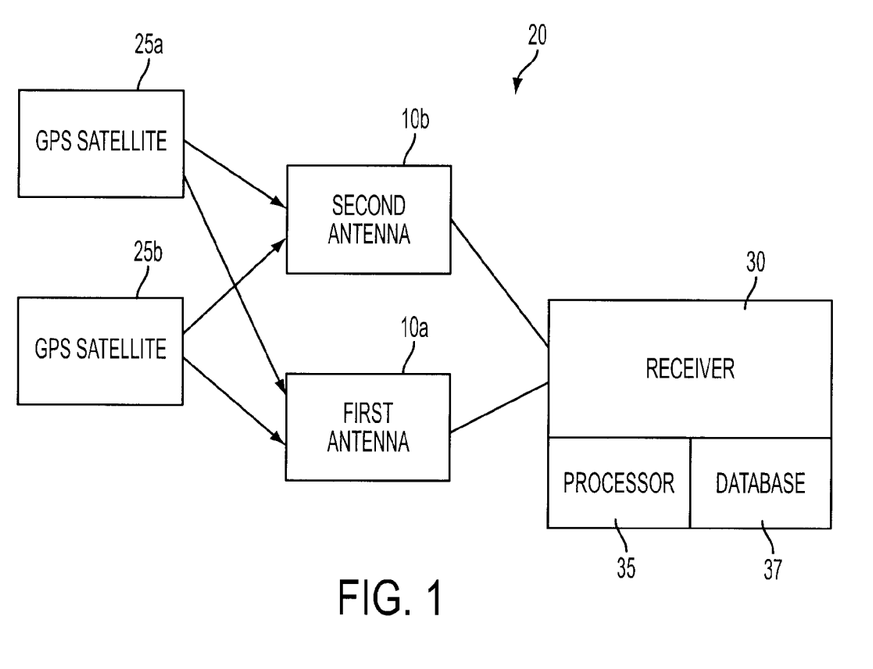
FIG. 1 is a diagram of the system in accordance with an embodiment of the present invention.

FIG. 1 is a diagram of one embodiment of a system which can be used for determining the bending angle of GPS signals. A pair of GPS antennae 10a, 10b is positioned so that second antenna 10b is located above of first antenna 10a in order to form an interferometer 20. A multi-channel GPS receiver 30 is operably connected to antennae 10a, 10b. GPS receiver 30 is provided with a processor 35 and a database 37 for processing the signals, and retrieving data related to the GPS satellites from the signals received by antennae 10a, 10b. Commercially available GPS receivers can measure both the L1 (1575.42 MHz) and the L2 (1227.60 MHz) carrier frequency phases. Although reference is made in the application to the use of carrier frequencies typically used in commercially available GPS receivers, the invention is not limited to these carrier frequencies and thus other carrier frequencies may also be employed. Furthermore, although antennae 10a and 10b are shown connected to only one receiver 30, it is possible to have each antenna connected to its own receiver or series of receivers. Additionally in some embodiments, more than two antennae can be used.

In an embodiment of the present invention discussed herein, the more commonly used L1 signal is used by way of example. Interferometer 20 can employ about a 0.5 to about a 10.0 meter vertical baseline separation between antennae 10a and 10b. This approximately 1.0 to 2.0 meter separation provides an angular resolution of approximately 0.02°. Using this angular resolution it is possible to measure the presence of strong refraction at elevation angles above those where ducting occurs, and thus to infer the presence of atmospheric ducting.

As seen from the Earth's surface a setting satellite appears slightly above the horizon even after its true geometric position is below the horizon. This is due to refraction of the GPS signal, primarily in the lower atmosphere. Part of the data continuously broadcast by GPS satellite 25 is ephemeris information for the satellite and the time on the satellite clock. Using this information the location of the satellite can be determined at any given moment. The actual elevation of the satellite can be calculated with an accuracy of 0.001°. The system and method of the present invention using GPS interferometer 20 measures the elevation angle of the apparent position of GPS satellite 25. The difference between actual elevation and apparent elevation of GPS satellite 25 is the total bending angle due to the atmospheric refraction and can be used to establish the presence or absence of atmospheric ducting.

The basic GPS carrier frequency phase measurement determines the relative distance between a GPS satellite 25 and each of antennae 10a, 10b. Spacecraft position and timing errors cancel, as do the propagation delays through both the ionosphere and the troposphere. The short baseline solves the wavelength ambiguity since a one wavelength error ($\lambda_L 1 \approx 19$ cm) converts to about a 10° error in elevation angle. The only measurement errors remaining are multi-path errors and receiver noise. Both multi-path errors and receiver noise are common to all GPS measurements. Multi-path errors are corrected to a large degree within current GPS receivers 30. Receiver noise is very low for current high-end GPS receivers 30 and can be further reduced by signal processing, which can occur at processor 35, which in this embodiment is contained within receiver 30. However it should be understood that the both processor 35 and database 37 may be external to receiver 30. Neither multi-path nor receiver noise are likely to limit GPS interferometry.

Figure 2:
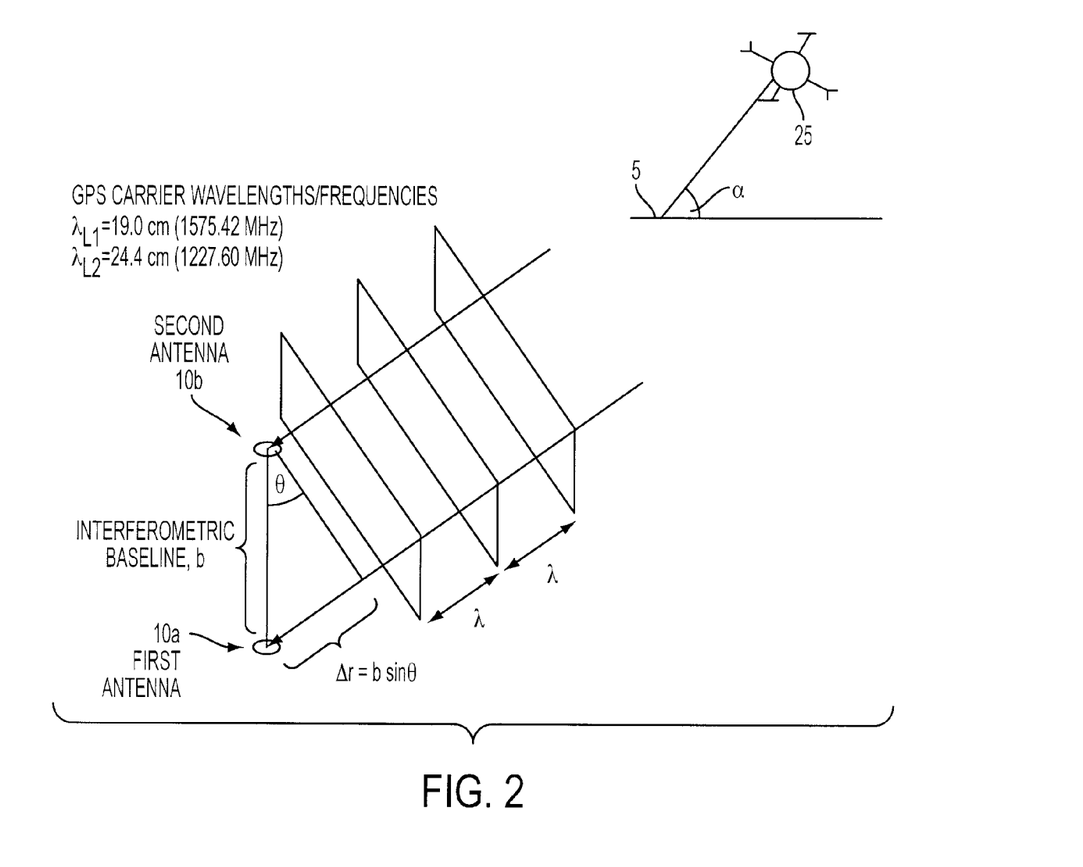
FIG. 2 is a diagram illustrating the calculation of the phase.

The problem unique to a GPS interferometer 20 is the precise determination of the length and orientation of the interferometric baseline (b), shown in FIG. 2. This determination is required because the apparent elevation angle of a GPS satellite 25 is measured with respect to the orientation of the interferometric baseline (b). This is where the full GPS constellation is used. GPS satellites 25 at higher elevation angles, wherein the angle α with respect to horizon 5 is greater than 15°, show very little sensitivity to tropospheric water vapor. It should be understood that angles less than 15° with respect to horizon 5 could be used but are not preferred since atmospheric conditions can affect the accuracy of the readings. Since GPS satellites 25 at higher elevation angles (>150 with respect to the horizon) are much less sensitive to atmospheric effects than those at low elevation angles, these GPS satellites 25 are used to orient interferometer 20. The measurement is only weakly sensitive to the exact location of interferometer 20, but is very sensitive to the relative location of antennae 10a, 10b (the interferometric baseline length) and the orientation with respect to local zenith. Again a differential GPS measurement, or in the present case, the phase ($\phi$) difference of the carrier frequency measured at each antenna 10a, 10b, provides an extremely precise relative location of antennae 10a, 10b. The resolution of the orientation of the interferometer involves a standard multi-antenna attitude determination. The equations used are $\Delta r = b \sin(\theta)$ and $\phi = \Delta r / \lambda$. This permits an accurate determination of the bending angle when signals are taken from GPS satellites 25 located below 10° with respect to the horizon and then compared with the data related to the true position of GPS satellites 25.

The ducting measurements from GPS satellites 25 are taken during rising and setting of satellites 25. The number of events (rises or sets) depends upon the latitude of the observer and will vary from ~48 near the equator to a maximum of 96 events per day near the poles. These numbers assume a constellation of 24 operating GPS satellites 25.

Figure 3:
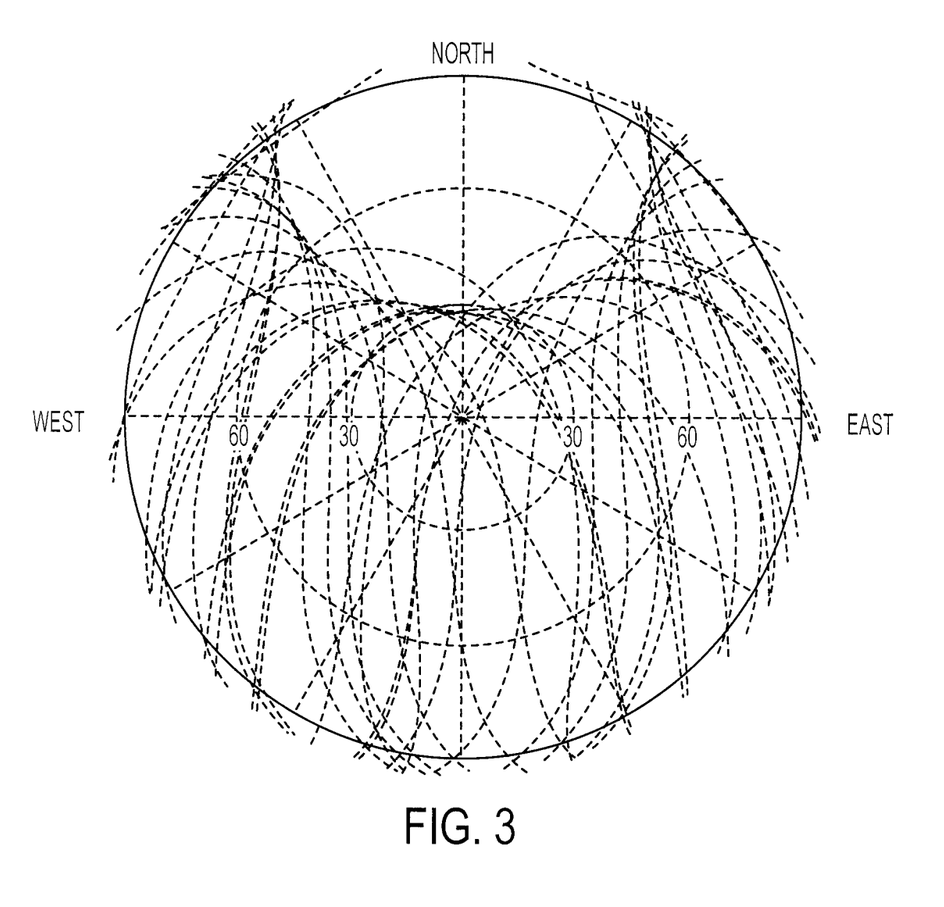
FIG. 3 shows the orbit tracks for one 24 hour period of all GPS satellites as seen by an observer at 32° north latitude.

FIG. 3 shows tracks of GPS satellites 25 across the sky for a 24-hour period, as seen from 32° north latitude. The concentric rings show various zenith angles. The geometric horizon is the outermost ring and the zenith is the center point. North is located towards the top of the FIG. 3. The most useful true elevation angles (i.e. true positions for satellites 25) for duct determination are from 2° above the horizon to about 0.5° below the horizon. Refraction brings the corresponding apparent, i.e. interferometrically measured, elevation angles (i.e. apparent position of GPS satellite 25) above the horizon. If GPS satellite 25 tracks vertically from the horizon then the time taken to traverse 2.5° is ~10 minutes. If the satellite track is angled with respect to vertical, as most are, then the time available for observation can be considerably longer. These long observation times allow multiple data samples, e.g. greater than 10 data samples for every 0.01° change in actual elevation. This allows time series data analysis to track, and remove corrupting interferometer motion.

Now turning to discussion of the refraction process and how it affects the GPS signals, the presence of surface level water vapor causes significant changes in the atmospheric index of refraction, n. Variations in the index of refraction affects both optical and radio (radar) propagation through the lower atmosphere. The normal propagation path through the atmosphere bends away from the local zenith due to both the spherical geometry of the Earth's atmosphere and the decrease in the index of refraction with altitude, z. These effects are most pronounced when looking within a few degrees of the horizon, and disappear entirely when looking toward zenith. Ducting can occur whenever the derivative of the index of refraction, $\partial n(z)/\partial z$, is less than $-1/R_{Earth}$. Such large changes of the index of refraction typically arise from the presence of water vapor in the atmosphere and/or temperature inversions. Of the various atmospheric constituents water vapor content is the most important, followed by sand from dust storms and heavy rainfall (>20 cm/hr~8 in/hr), which can have a maximum contribution ~10% that of water vapor. Clouds, hail, snow, etc. are insignificant in comparison.

Calculations of atmospheric bending have been performed employing both actual refractivity profiles and approximate bi- and tri-linear fits to the modified refractivity. Snell's Law in a spherical geometry becomes, $n(z)(R_{Earth}+z)\sin(\theta) = $ constant, where $R_{Earth}$ is the Earth radius and $\theta$ is the local zenith angle. The index of refraction is written as $1+N(z)$, where $N(z)$ is the refractivity. The modified refractivity, $M(z)$, is defined as $N(z)+z/R_{Earth}$. And the modified index of refraction is $m(z) = 1+M(z)$. The second term accounts for the spherical geometry of the Earth's atmosphere. The advantage of the modified refractivity is that it accounts for the spherical geometry and the plot of $M(z)$ is easily interpreted. If $\partial M(z)/\partial z > 0$ for all z then ducting cannot occur. Contrarily, if $(\partial M(z)/\partial z)|_{z=a} < 0$ then ducting will occur for some elevation angle for a receiver positioned at altitude $z=a$. Plots of the refractivity and modified refractivity for actual ducting and non-ducting atmospheres measured in the Persian Gulf are shown in FIGS. 4(a) and 4(b).

Figure 4A:
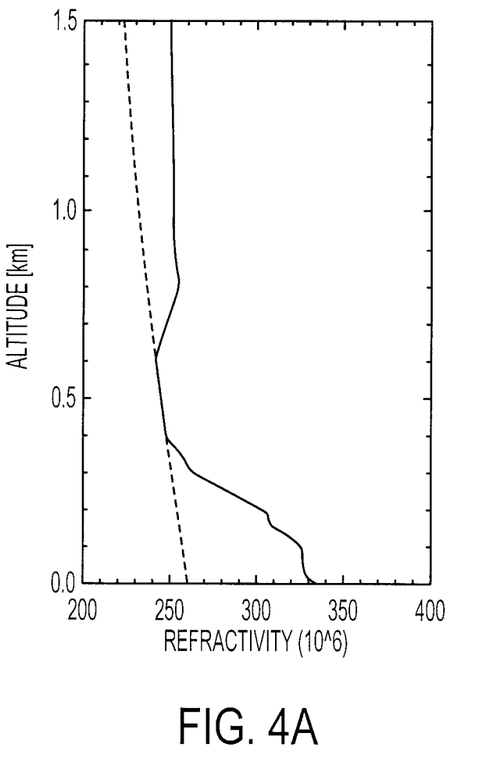
FIGS. 4a-4b are graphs showing two atmospheric refractivity profiles.
Figure 4B:
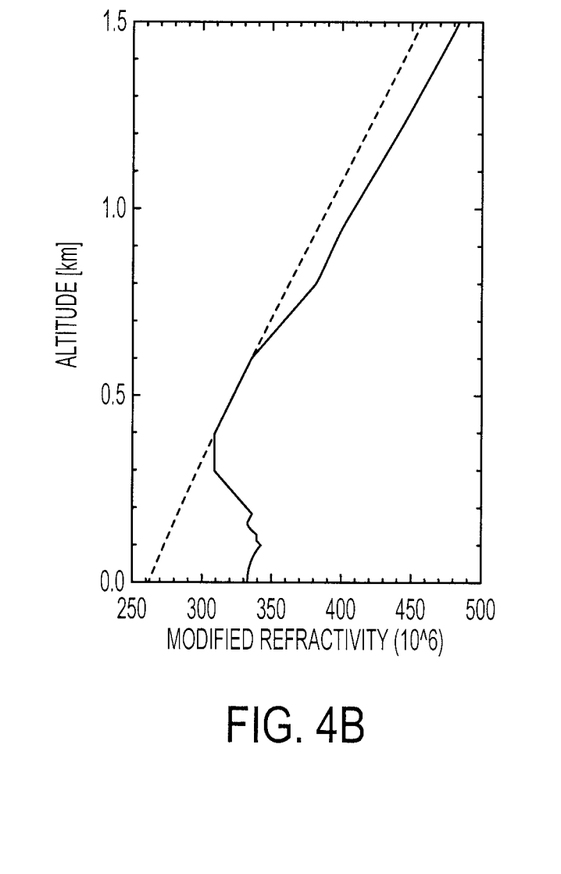

FIG. 4a shows two atmospheric refractivity profiles from a combination of Persian Gulf radiosondes and aircraft observations during April 1996. The dashed lines show the "dry" atmosphere (non-ducting) and the solid lines the "wet" atmosphere (ducting). FIG. 4b shows the modified refractivities of the same profiles shown in FIG. 4a. The negative slope of the modified refractivity between 100 m and 400 m altitude denotes the ducting layer. However, below 100 m and above 400 m the "wet" atmosphere does not duct.

Ray tracing through spherically symmetric atmospheres is a straightforward application of Snell's Law. Given the index of refraction profile and the receiver altitude one integrates the signal path from the receiver 30 to the satellite 25. The initial condition is the zenith angle, θ, or equivalently the elevation angle, of the ray trace leaving the receiver 30.

Figure 5A:
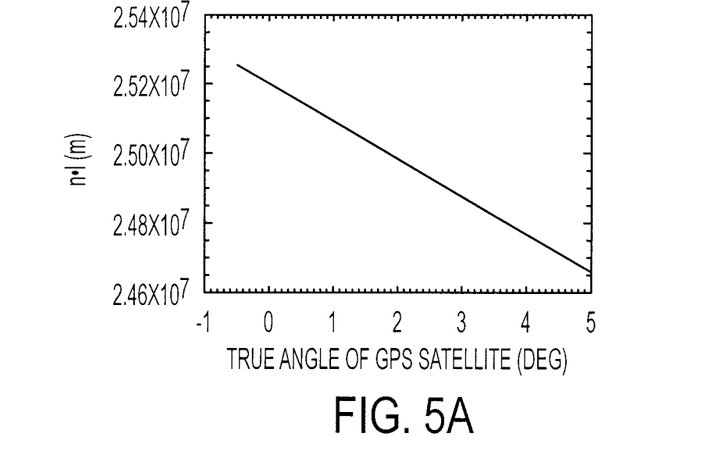
FIG. 5a is graph of the absolute distance to a GPS satellite from a receiver on the Earth's surface.
Figure 5B:
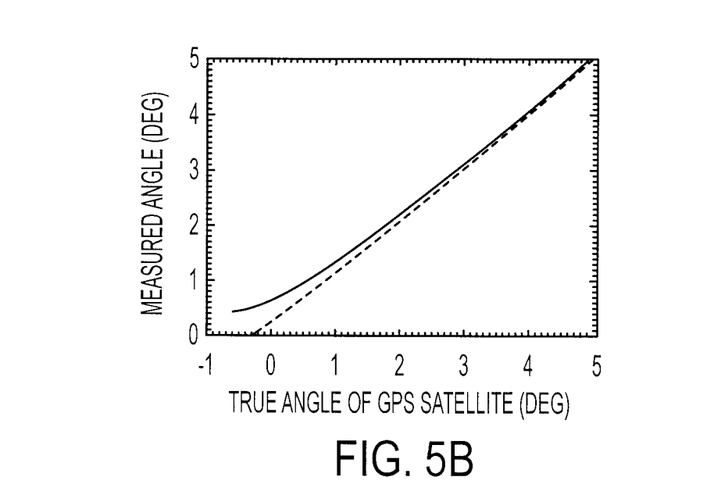
FIG. 5b is a graph of the apparent elevation angle as seen by the receiver in dry atmosphere, shown by the dashed line and in wet, moderately ducting atmosphere, shown by the solid line.
Figure 5C:
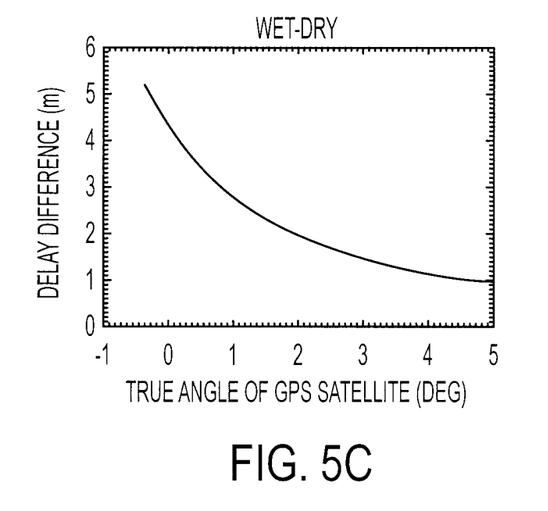
FIG. 5c is a graph of the differences due to atmospheric conditions (wet vs. dry) for the timing delay.
Figure 5D:
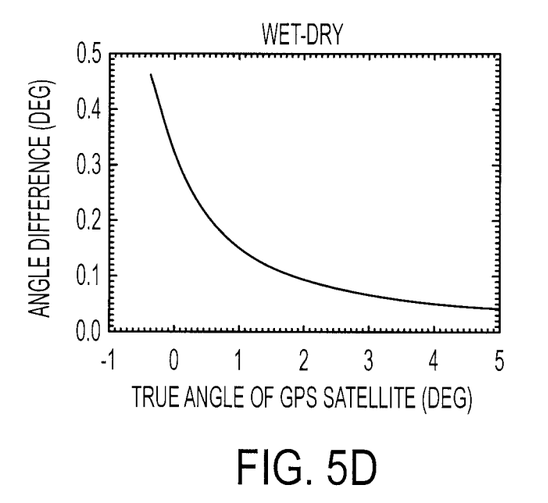
FIG. 5d is a graph of differences in the bending angle due to atmospheric conditions.

General results of the comparison of the ducting and non-ducting atmospheres are shown in FIGS. 5a-5d. FIG. 5a shows the absolute distance to a GPS satellite 25 from a receiver 30 on the Earth's surface. FIG. 5b shows the apparent elevation angle as seen by receiver 30 for dry atmosphere (dashed line) and wet, moderately ducting atmosphere (solid line). FIGS. 5c and 5d show the differences due to atmospheric conditions (wet vs. dry). FIG. 5c shows differences in timing delays. FIG. 5d shows differences in the bending angle. Typical error bars for the absolute timing delays are ~5 m and for the angular difference an uncertainty less than ~0.05° is attainable and sufficient. Therefore, measuring the absolute path length difference (i.e. timing delays) does not distinguish between these two realistic atmospheres, because the signal to noise ratio is too low. However, the interferometric measurement of the bending angle, having a higher signal to noise ratio, separates the moderately ducting atmosphere from the non-ducting dry atmosphere. All results are plotted with the true, geometric elevation angle as the independent variable. The geometric elevation angle is known from the broadcast navigation data to a precision of better than 0.001°. Errors of that magnitude are insignificant.

Figure 6:
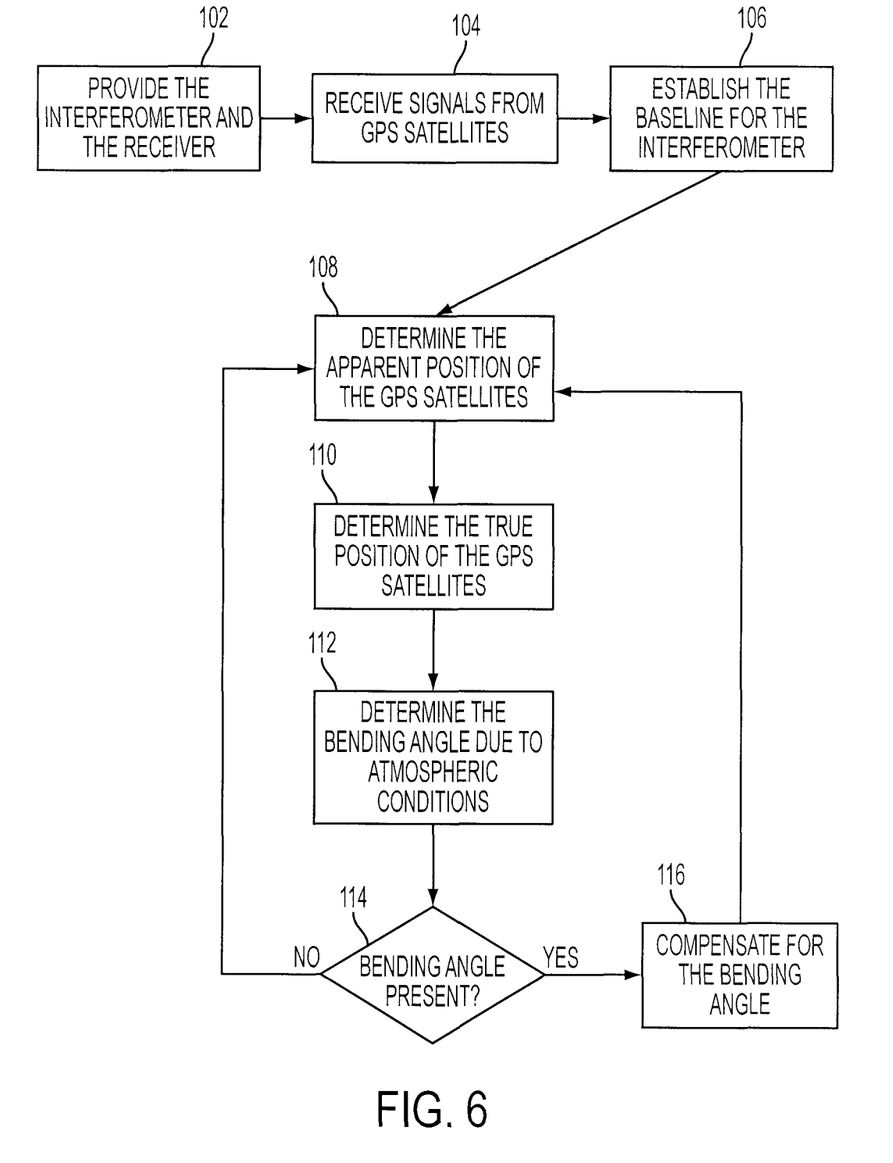
FIG. 6 is a flow chart showing the method for determining the presence of atmospheric ducting.

FIG. 6 shows a method for detection and measurement of the bending angle caused by atmospheric ducts. The method combines two independent measurements both of which are derived from the GPS constellation. Interferometric GPS differences and the phases of the L1 (or L2) GPS carrier frequency are measured at two separated antennae 10a, 10b.

In step 102 interferometer 20, comprised of two antennae 10a and 10b, is provided. In step 104, signals are received from GPS satellites 25 that are preferably located 15° or more above the horizon. In step 106, the signals received from GPS satellites 25 in step 104 are used to establish baseline (b) of interferometer 20. This is discussed in detail above with respect to FIG. 2.

In step 108, the apparent position of GPS satellite 25 is determined based upon the signals received at interferometer 20. Typically this measurement is taken on a GPS satellite 25 that is located at an apparent position of less than 10° above the horizon. It should be understood that measurements can be taken from GPS satellites located at positions greater than 10° above the horizon, however the ability to determine bending angles is diminished. In step 110, the true position of GPS satellite 25 is determined. This determination is made from the data that is carried in the signal from GPS satellite 25 and retrieved and/or processed by processor 35 and database 37 located at receiver 30, which is operably connected to interferometer 20. The apparent position and the true position of GPS satellite 25 are then processed and the difference between the two positions calculated in order to find the bending angle due to atmospheric conditions. At step 114, it is determined if a bending angle exists or not, and, if so, what the bending angle is. If there is no bending angle present, then there is no need for compensation and the system can return to step 108 and continue to determine the apparent position of GPS satellites 25. Polling of GPS satellites 25 can occur over a period of time, and at predetermined intervals or continuously. At step 116, if there is a bending angle, the system can then compensate with the system that this compensation is being done for, e.g. a targeting system. The system will continue to poll GPS satellites 25 in order to continue to update the bending angle caused by atmospheric conditions.

Advantages of the system and method described in FIG. 1 and FIG. 6 are that interferometric GPS measurements provide a more precise, accurate and useful real-time assessment of local atmospheric refractivity than either radiosondes or GPS timing delay measurements. The GPS measurements mimic precisely the target detection sensors used by the ship. However, in using this method, since the position of the target is known, the offset between the apparent and the true position can be calculated.

Other advantages of the method and system are that a precise, absolute GPS positioning of interferometer 20 is not required. Measurements can be made near the horizon every 15-30 minutes, day and night or continuously. The use of uncontrolled balloons and their attendant hazards to local air traffic are eliminated by the method and system of the present invention. GPS interferometer 20 operates autonomously in the sense that only GPS L1 and L2 signals and GPS broadcast navigation data are employed. The system and method does not require higher-order ephemeris and satellite clock corrections. The only known alternatives, radiosondes and GPS timing, do not provide the ease, precision, accuracy, versatility or low-cost of the GPS interferometer of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for determining a bending angle with an antenna and receiver system positioned onboard a moving vehicle, the method comprising:
   receiving a first GPS signal from a first GPS satellite, the first GPS satellite having an apparent position of less than 10 degrees above the horizon;
   determining a true position of the first GPS satellite from information encoded in the first GPS signal;
   receiving, by a first antenna and a second antenna positioned above the first antenna, GPS signals from a plurality of GPS satellites located at more than 15 degrees above the horizon;
   determining an orientation of a baseline between the first antenna and the second antenna based on a phase difference of a carrier frequency of the GPS signals received by the first antenna and the second antenna from the plurality of GPS satellites positioned at least 15 degrees above the horizon without reference to differential global position system or DGPS ground station signals;
   determining an apparent position of the first GPS satellite from the first GPS signal and the orientation of the baseline;
   wherein said determining the apparent position of the first GPS satellite and determining the true position of first GPS satellite is repeated over a time period of at least ten minutes as the first GPS satellite moves between a true position of −0.5 degrees and +2 degrees above the horizon at a rate of at least ten samples for every 0.01 degree change in actual satellite elevation;
   determining the bending angle by calculating the difference between the elevation angle of the apparent position and the elevation angle of the true position of the first GPS satellite; and
   using time series data analysis to track and remove corrupting interferometric motion.

2. The method of claim 1, wherein the second antenna is positioned from about 0.5 to about 10.0 meters above the first antenna.

3. The method of claim 1, wherein the first satellite is located at a true position less than 2 degrees above the horizon and less than 0.5 degrees below the horizon.

4. The method of claim 1, wherein the interferometer and the receiver are located on a water capable vessel.

5. The method of claim 1, wherein a presence of atmospheric ducting is determined from the bending angle.

6. The method of claim 5, further comprising: compensating for the presence of the atmospheric ducting.

7. A method for determining a bending angle of an atmosphere due to presence of atmospheric ducting with an antenna and receiver system carried onboard a moving vehicle, the method comprising:
   receiving, by a first antenna and a second antenna positioned above the first antenna, GPS signals from a plurality of GPS satellites located at an apparent position greater than 15 degrees above the horizon; and
   determining the orientation of the baseline between the first antenna and the second antenna with respect to a local zenith based on a phase difference of a carrier frequency of GPS signals received by the first antenna and the second antenna from the plurality of GPS satellites positioned at least 15 degrees above the horizon without reference to differential global position system or DGPS ground station signals;

receiving, by the first antenna and the second antenna, a second GPS signal from a second GPS satellite located at an apparent position less than 10 degrees above the horizon;

determining an apparent position of the second GPS satellite from the second GPS signal and the orientation of the baseline;

determining a true position of the second GPS satellite from encoded data in the second GPS signal;

wherein said determining the apparent position of the first GPS satellite and determining the true position of first GPS satellite is repeated over a time period of at least ten minutes as the first GPS satellite moves between a true position of −0.5 degrees and +2 degrees above the horizon at a rate of at least ten samples for every 0.01 degree change in actual satellite elevation;

determining a bending angle by calculating the difference between the apparent position and the true position of the second GPS satellite; and using time series data analysis to track and remove corrupting interferometric motion.

8. The method of claim 7, wherein the antennae and the receiver are located on a water capable vessel.

9. The method of claim 1, wherein said determining an orientation of a baseline between the first antenna and the second antenna from the received GPS signals comprises determining an orientation of the baseline between the first antenna and the second antenna based only on phase differences between GPS L1 and L2 signals received at the first antenna and the second antenna and on GPS broadcast navigation information received by the first antenna and the second antenna from a plurality of GPS satellites positioned at least 15 degrees above the horizon without reference to differential global position system or ground station signals, and without using higher order ephemeris and satellite clock corrections.

10. The method of claim 7, wherein said determining an orientation of a baseline between the first antenna and the second antenna from the received GPS signals comprises determining an orientation of the baseline between the first antenna and the second antenna based only on phase differences between GPS L1 and L2 signals received at the first antenna and the second antenna and on GPS broadcast navigation information received by the first antenna and the second antenna from a plurality of GPS satellites positioned at least 15 degrees above the horizon without reference to differential global position system or ground station signals, and without using higher order ephemeris and satellite clock corrections.

* * * * *